United States Patent

[11] 3,588,378

[72] Inventor Arthur I. Protas
New York, N.Y.
[21] Appl. No. 753,979
[22] Filed Aug. 20, 1968
[45] Patented June 28, 1971
[73] Assignee Cartridge Television, Inc.
New York, N.Y.

[54] TAPE RECORDING AND REPRODUCING SYSTEM OF THE SKIP FIELD TYPE, WITH SEPARATE RECORDING HEAD
3 Claims, 8 Drawing Figs.

[52] U.S. Cl. ......... 179/100.2T, 178/6.6A, 178/6.6P, 178/6.65F, 179/100.2CA
[51] Int. Cl. ......... G11b 5/52, G11b 5/56, H04n 5/78
[50] Field of Search ......... 178/6.6 (A), 6.6 (SF), (PS), (C), (FSS); 179/100.2 (T,CA)

[56] References Cited
UNITED STATES PATENTS

| | | | |
|---|---|---|---|
| 3,152,223 | 10/1964 | Wessels | 178/6.6 |
| 3,235,670 | 2/1966 | Kihara | 178/6.6 |
| 3,359,365 | 12/1967 | Kihara | 178/6.6 |
| 3,375,331 | 3/1968 | Okazaki | 179/100.2 |
| 3,391,248 | 7/1968 | Hirota | 178/6.6 |
| 3,376,395 | 4/1968 | Rumple | 179/100.2 |

*Primary Examiner*—Bernard Konick
*Assistant Examiner*—Raymond F. Cardillo, Jr.
*Attorneys*—Townsend and Townsend, Irwin P. Gafinkle and Smith, Michael, Bradford & Gardiner ABSTRACT: An improved apparatus and method for recording and reproducing electronic signals on a magnetic tape, wherein rotatable record and playback heads are utilized to scan oblique tracks on a movable magnetic tape. The record head, after a recording phase, is movable out of scanning relationship to a number of signal tracks on a movable magnetic tape and the playback heads are moved into such scanning relationship prior to the playback phase. The playback heads successively scan a single track for each revolution to permit tape conservation. Several embodiments of the apparatus of the invention can be used to change from the recording phase to the playback phase.

INVENTOR.
ARTHUR I. PROTAS
BY Townsend and Townsend
ATTORNEYS

INVENTOR.
ARTHUR I. PROTAS
BY Townsend and Townsend
ATTORNEYS

INVENTOR.
ARTHUR I. PROTAS
BY Townsend and Townsend
ATTORNEYS

TAPE RECORDING AND REPRODUCING SYSTEM OF THE SKIP FIELD TYPE, WITH SEPARATE RECORDING HEAD

This invention relates to improvements in tape transports and, more particularly, to a tape transport of the type utilizing rotatable transducer means for recording and reproducing electronic signals on oblique tracks of a movable magnetic tape.

The present invention provides a tape transport system of the type utilizing rotatable transducer means capable of being coupled to a movable magnetic tape to record and reproduce electronic signals on oblique, spaced tracks of the tape. While the invention resides in both apparatus and method for recording and reproducing such signals, the apparatus can readily be described with reference to a rotatable drum whose outer periphery is provided with a record transducer or head for recording the tape tracks and a number of playback transducers or heads arranged to successively scan the same track of a moving magnetic tape for each revolution of the drum and tape speeds are properly adjusted.

Each track is made by the record head as it scans the tape obliquely and, by reproducing the signal on each track two or more times, the principle of conservation of tape can be achieved. This feature is adapted for a number of different uses but it is especially suitable for use in recording and playing back video signals. By recording only one of two fields of a video image frame and then playing back such recorded field twice, the image of the frame is essentially reproduced and is of sufficient picture quality without having to record the entire frame as is normally done. By handling a number of successive video frames in this manner, the capacity of the tape is doubled and the recorded images, played back at a rate above the flicker rate of the human eye, are observable with no substantial discontinuities between frames.

By recording video signals with one head and then playing back the signals with other heads, a tape transport system can be simplified in that it is not necessary to utilize its record head for playback purposes. To accomplish this, the playback heads are moved relative to the tape and into positions for scanning the record tracks on a tape before a playback phase has commenced and after a record phase has been completed. The record head is moved relative to and out of scanning relationship to the tape tracks to accommodate the playback heads and such movement of the record head relative to the tape preferably occurs simultaneously with the aforesaid movement of the playback heads relative to the tape. Thus, the record head does not scan the tape tracks during the playback phase. In the apparatus of the invention, means is provided to permit movement of the drum and the tape relative to each other so that, when the tape is in a first operative position to the drum, the record head scans the tape and records the record tracks thereon as the tape moves linearly and as the drum rotates relative to the tape. When the tape has been moved into a second operative position relative to the drum, the record head is out of scanning relationship to the record tracks and the playback heads are in scanning relationship to such tracks. The playback heads are vertically staggered with their central planes in parallel relative to each other so that the heads successively scan each record track for each revolution of the drum.

The tape and drum can be moved relative to each other in a number of different ways. For instance, the drum can be rotated through an angle relative to the tape so that the record head, positioned circumferentially relative to an adjacent playback head, can be moved out of scanning relationship to the record tracks as the adjacent playback head moves into such scanning relationship.

Another way of accomplishing this orientation of the heads is to cause the drum to move axially relative to the tape. Thus, the record head, disposed axially of the adjacent playback head, is moved in an axial direction by an amount to cause the adjacent playback head to occupy the position previously occupied by the record head.

Still a third way of accomplishing this orientation is to utilize a drum having a pair of axially aligned drum sections adjacent to a pair of slots which receive a tape cartridge. One of the drum sections has a record head on its outer periphery while the other drum section has the playback heads on its outer periphery. The drum sections will have a common axis and will rotate together, the cartridge reels being driven in any suitable manner and at a predetermined speed when the cartridge is in either slot. Also, the tape will be adjacent to the corresponding drum section and located so as to be scanned by the corresponding head or heads when the cartridge is in either slot.

The primary object of this invention is, therefore, to provide a tape transport system, including a tape recording and reproducing apparatus and method, wherein electronic signals can be recorded by a rotatable record head on oblique tracks of a moving magnetic tape when the tape is in a first operative position relative to the path of travel of the record head and such signals can be played back by a number of playback heads spaced from the record head when the tape is in a second operative position relative to the path of travel of the record head to thereby simplify the system by eliminating the use of the record head for playback purposes.

Another object of this invention is to provide a tape transport system of the type described wherein the single record head and the plurality of playback heads permits the system to utilize the principle of the conservation of tape, especially when the system is used to record and reproduce video signals, whereby the capacity of the tape is increased because less than all of a video transmission is recorded and the recorded portions are played back a number of times at a rate above the flicker rate of the human eye to thereby provide an acceptable reproduction of the transmitted video image or signal.

A further object of this invention is to provide a tape transport system of the aforesaid character wherein the tape can be mounted on reels forming a permanent part of a tape deck or can be mounted on a cartridge for portable operation, whichever is desired.

Other objects of this invention will become apparent as the following specification progresses, reference being had to the accompanying drawings for illustrations of several embodiments of the apparatus of the invention.

Figure 1:
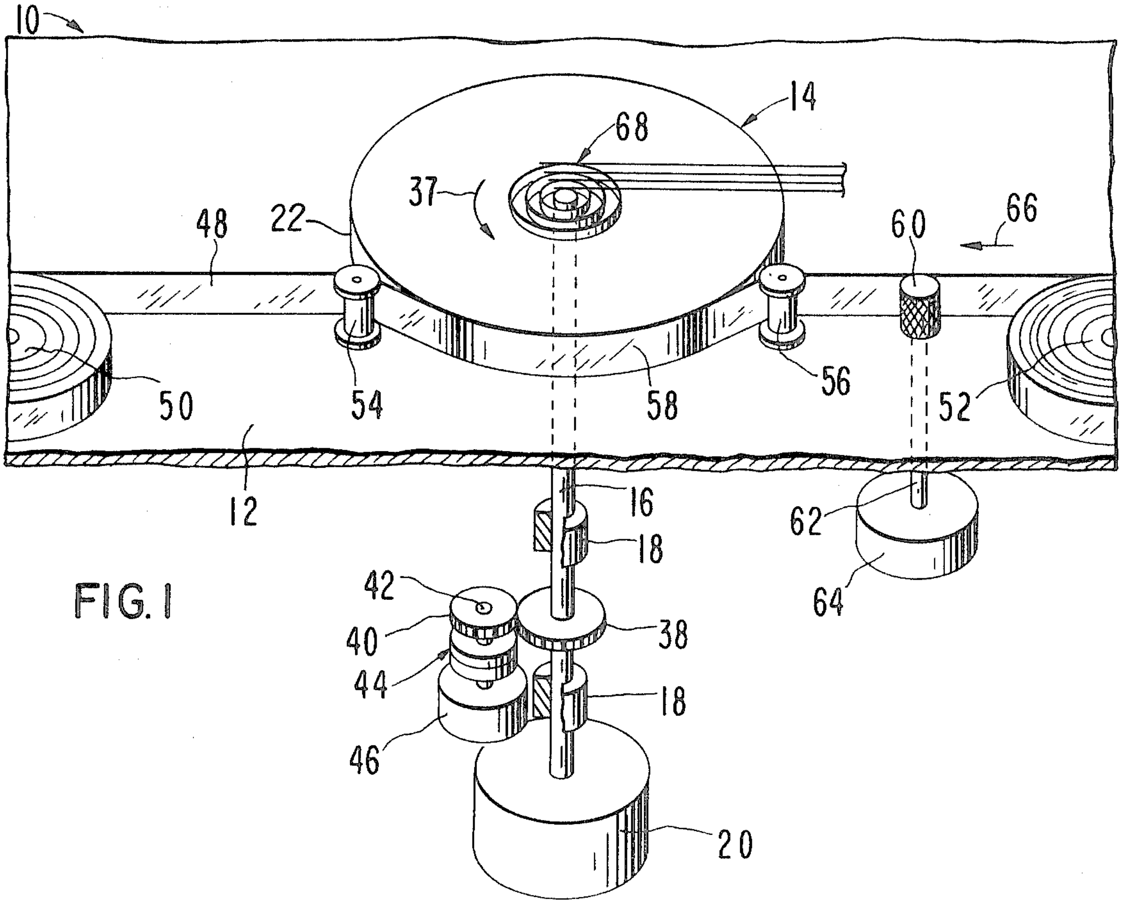
FIG. 1 is a fragmentary, perspective view of one embodiment of the tape transport.

The first embodiment of the invention is broadly denoted by the numeral 10 and includes a tape deck 12 having a rotatable drum 14 thereon for rotation about a generally vertical axis defined by the drum shaft 16 which extends below deck 12. Shaft 16 is journaled for rotation in a pair of spaced bearing blocks 18 secured in any suitable manner to support structure (not shown) forming a part of transport 10. A motor 20 coupled to shaft 16 below deck 12 causes the shaft and thereby drum 14 to rotate in a predetermined direction. This motor is controlled in any suitable manner by structure (not shown) in transport 10.

Figure 2:
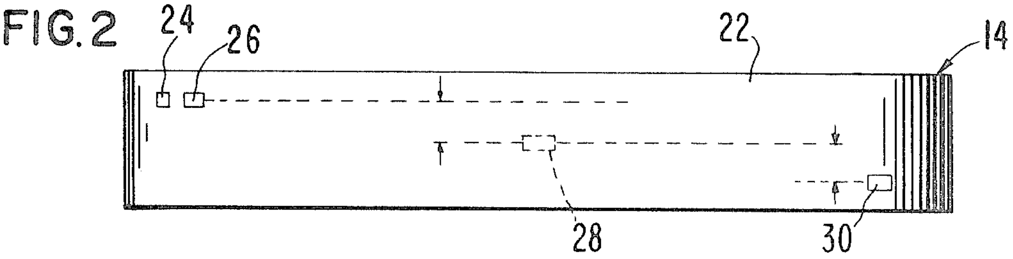
FIG. 2 is a side elevational view of the drum therefor.
Figure 3:
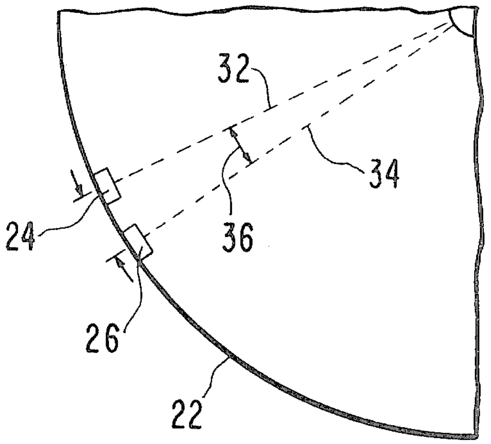
FIG. 3 is a fragmentary, top plan view of the drum of FIG. 2.
Figure 4:
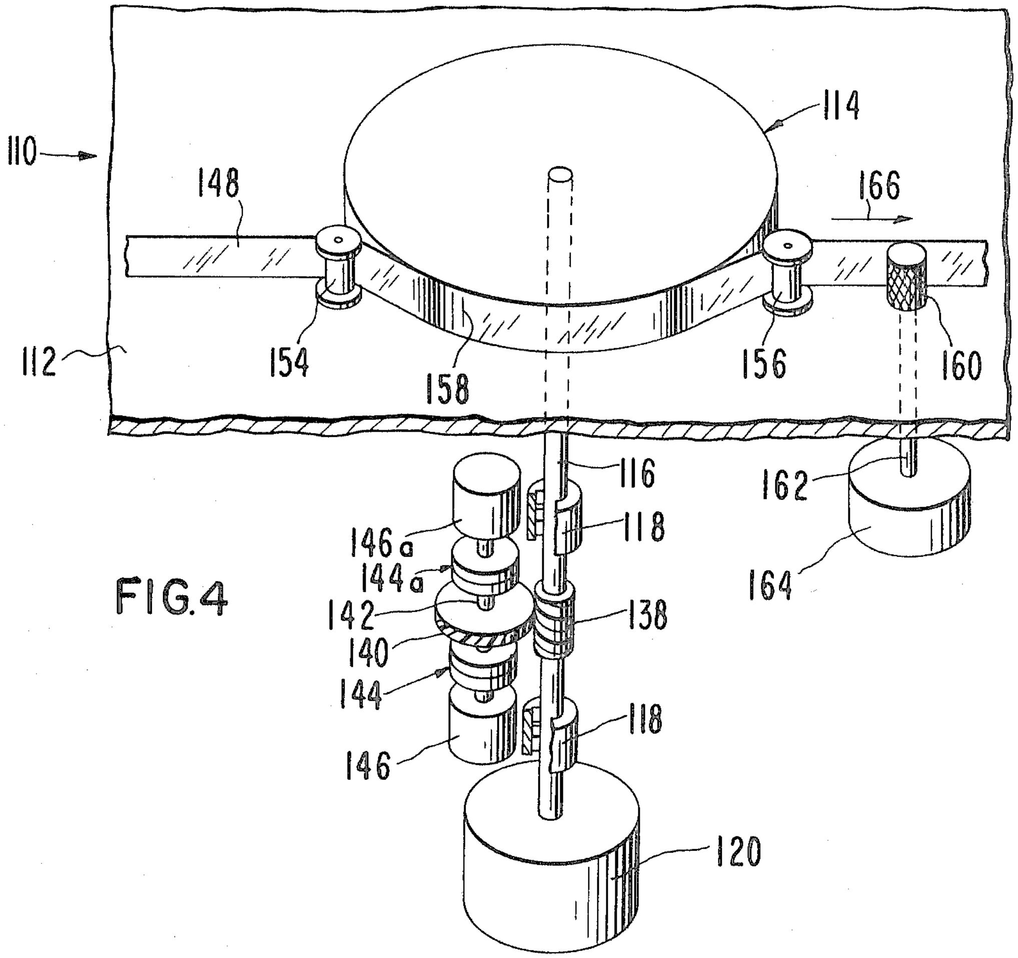
FIG. 4 is a view similar to FIG. 1 but showing another embodiment of the invention.

Drum 14 has an outer periphery 22 on which are mounted a record transducer or head 24 and a number of playback transducers or heads 26, 28 and 30 which are circumferentially disposed relative to the central axis of the drum. Also, heads 26, 28 and 30 are in parallel, axially spaced planes with respect to the drum axis as shown in FIG. 2. Head 26 is angularly displaced from head 24 by a small arcuate distance denoted by angle 36, the radial, dashed lines 32 and 34 (FIG. 3) extending from these two heads to the axis of the drum to define angle 36. For purposes of illustration, drum 14 rotates in the direction of arrow 37 during the recording and reproducing phases of operation of transport 10. Also, head 30 follows head 28 and head 28 follows head 26 during drum rotation.

The drum shaft is provided with a spur gear 38 preferably disposed between bearing blocks 18 (FIG. 1). Gear 38 is in mesh with a second spur gear 40 coupled to a shaft 42 forming a part of a slip clutch 44, the latter being coupled to a drive motor 46 to rotate shaft 42 in a preselected direction. The purpose of gears 38 and 40 is to rotate shaft 16 through the small angle 36 to change from a recording phase to a playback phase. When this occurs, drum 14 rotates in a direction opposite to the direction denoted by arrow 37 whereby head 26 moves into the position previously occupied by head 24. Slip clutch 40 allows normal rotation of shaft 16 at high speed in the direction of arrow 37 under the influence of motor 20.

A movable magnetic tape 48 is carried on a pair of reels 50 and 52, each reel having a reel drive (not shown) which is reversible and operates to maintain tension on the tape during operation of transport 10 as well as to provide for rewinding the tape after a record or playback operation. A pair of tape guides 54 and 56 are carried by deck 12 for positioning a stretch 58 of tape 48 adjacent to and in juxtaposition with a portion of outer periphery 22. A tape capstan 60 is disposed for driving the tape in a predetermined direction, such as the direction denoted by arrow 66, the capstan being connected to a shaft 62 driven by a capstan drive 64.

Shaft 16 is canted with respect to the vertical or to the upper surface of deck 12 so that the drum outer periphery 22 and the tape will be angularly disposed with respect to each other. This feature assures that the tape tracks will be oblique with respect to the longitudinal axis of the tape.

In operation, tape 48 is wound on reels 50 and 52 and disposed adjacent to the drum outer periphery. The drum is set into rotation generally before the tape is so positioned and guide 56, assuming the tape moves in the direction of arrow 66, is positioned in spaced relationship to the drum to form a wedge-shaped area between the drum and the tape at the downstream end of the stretch 58. This wedge-shaped area causes an air bearing to be formed due to the rotation of the drum, which air bearing keeps the tape out of substantial contact with the drum yet allows the heads to scan the tape.

Figure 6:
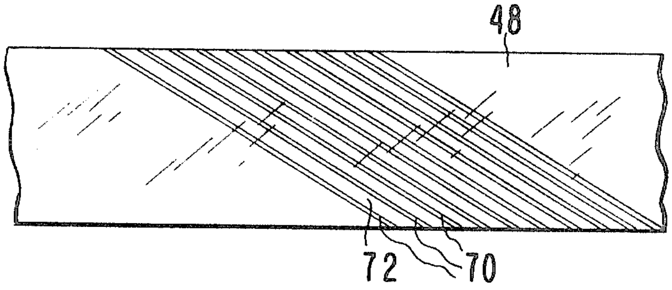
FIG. 6 is a side elevational view of the tape used with the present invention, showing the oblique record tracks thereon.
Figure 7:
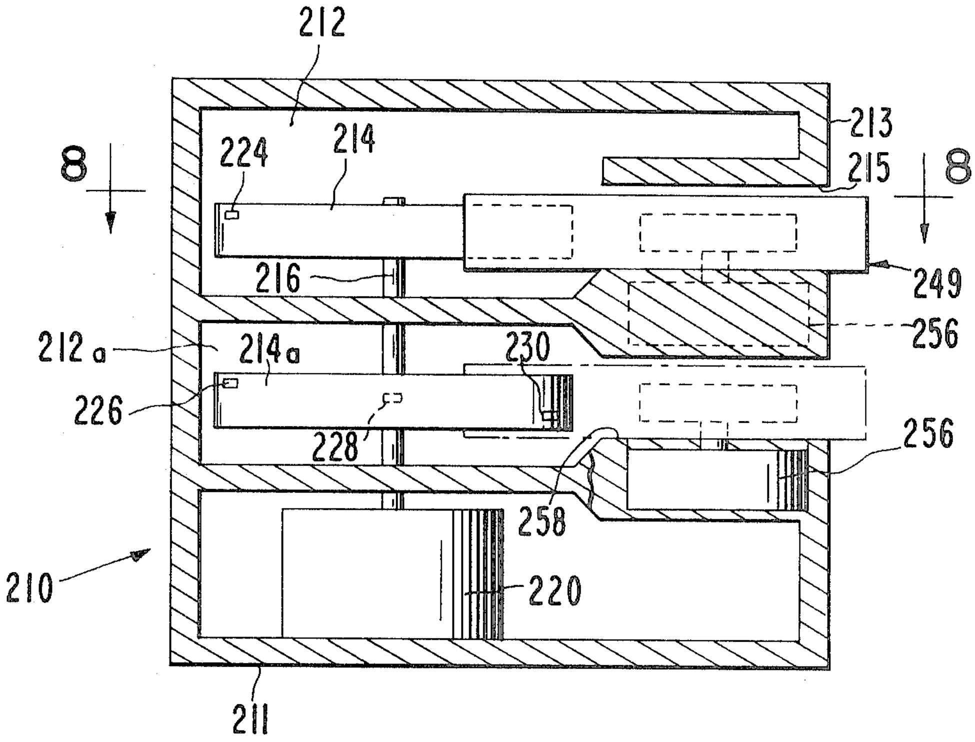
FIG. 7 is a cross-sectional view of a third embodiment of the invention.
Figure 8:
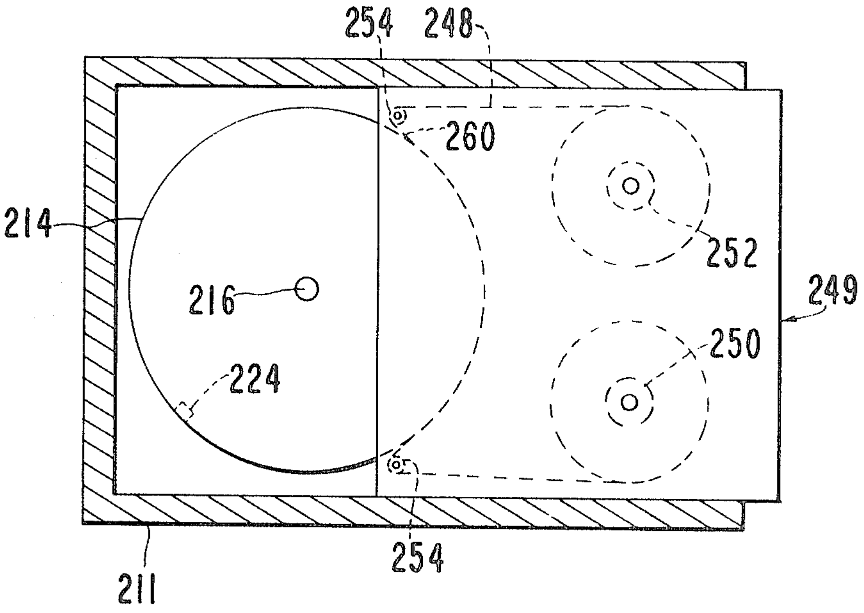
FIG. 8 is a cross-sectional view taken along line 8–8 of FIG. 7.

After the drum has been set into rotation, the tape is recorded by directing a signal to the record transducer 24. Such a signal can be applied to this transducer by a brush assembly 68 secured to the drum in any suitable manner, such as is shown in FIG. 1. The source of the signal to be recorded may be video camera or other suitable apparatus. The record tracks will be applied to tape 48 in the manner shown in FIG. 6 wherein each track 70 is spaced apart from the adjacent track by a space 72. The relative speeds of the drum and tape will determine the angularity of and spacing between tape tracks.

After the recording step, the tape is reversed and to this end, means (not shown) is provided on tape transport 10 to move the capstan out of engagement with the tape. Thus, the reel drives will be utilized to reverse the tape. The air bearing will still be present if the drum continues to rotate.

For the playback of the recorded signals, motor 46 is first energized to cause the spur gears and thereby shaft 16 to rotate through angle 36. This movement causes head 24 to move out of scanning relationship to the tape tracks 70 and causes head 26 to move into scanning relationship with these tracks since head 26 assumes the position previously occupied by head 24. The tape is then advanced at the playback speed and the playback heads are angularly displaced relative to each other so that they scan the same tracks for each revolution of the drum as the tape moves linearly in the direction of arrow 66 at the tape playback speed. This feature permits the recorded signal on each track to be played back three times before the signal on the next track is played back. The benefits of tape conservation can, therefore, be attained with the use of tape transport 10, thus rendering it especially suitable for recording and reproducing video signals in situations where maximum tape capacity is desired.

During the playback operation, head 24 does not scan track 70 but scans spaces 72 between the tracks. The recording transducer does not, therefore, contribute to the playback operation.

While three playback heads have been shown and described, it is clear there can be two or more such heads to obtain the benefits of tape conservation. In all cases, the heads will be in different axial planes relative to the drum axis and will be angularly displaced and arranged circumferentially relative to each other to cause the playback heads to scan the same track for each revolution of the drum.

While the drum has been described as being movable relative to the tape, this embodiment of the apparatus also contemplates moving the tape relative to and circumferentially of the drum outer periphery to bring the playback heads into scanning relationship to the record heads. This can be done with the use of suitable structure which effects the movement of the tape the required distance along the drum. Also, control means (not shown) is provided to assure alignment of the playback heads with the record tracks. To this end, the tape can be provided with a control track and a head is provided to read the control signal on the control track. The control signal can control the speed of motor 20 so as to effect the proper alignment of the heads with the record tracks if necessary.

Figure 5:
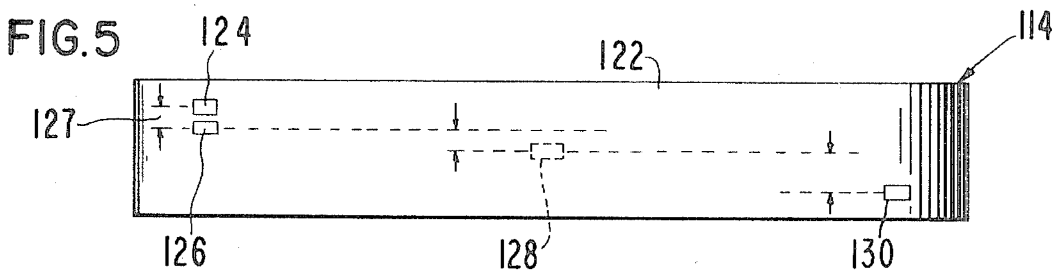
FIG. 5 is a side elevational view of the drum of the second embodiment.

The second embodiment of the invention is broadly denoted by the numeral 110 and includes tape deck 112 having a drum 114 mounted for rotation on a shaft 116 which, in turn, is journaled by a pair of bearing blocks 118. A drum drive 120 rotates shaft 116 so that the outer periphery 122 of drum 114 will move in scanning relationship to a stretch 158 of a movable magnetic tape 148. Drum 114 is provided with a record head 124 and a number of playback heads 126, 128 and 130, the playback heads being circumferentially spaced apart and in respective axial planes relative to the drum axis. Head 126 is axially aligned with head 124 (FIG. 5) but is spaced therefrom by an axial distance 127.

Shaft 116 is angled relative to the vertical or to the upper surface of deck 112 to position outer periphery 122 at an angle relative to tape 148. Thus, the heads scan the tape along oblique paths.

Shaft 116 has a worm 138 and a worm gear 140 is in mesh with worm 138. A shaft 142 coupled to gear 140 forms a part of a slip clutch 144 connected to a motor 146 and a slip clutch 144*a* connected to motor 146*a*. The purpose of the worm and worm gear is to raise and lower the drum with respect to stretch 158. Thus, the drum can be moved axially relative to the tape from a record position with head 124 in scanning relationship to tape tracks on tape 148 to a playback position with head 126 in scanning relationship to such tape tracks.

Slip clutches 144 and 144*a* may be of any suitable construction to allow relative fast rotation of shaft 116 during record or playback operations. For instance, each clutch may be electrically actuated and also be independently actuatable relative to the other clutch. Thus, both clutches can be deactuated at the same time and one clutch can be actuated while the other clutch is deactuated. As another example, worm gear 140 can be mounted for controlled movement into and out of couple relationship to worm 138 and be driven by a reversible motor. Motor 120 may move axially with shaft 116 or the shaft may move relative to the motor.

A capstan 160 connected to a shaft 162 has a drive motor 164, whereby the capstan can advance the tape in a predetermined direction, such as in the direction of arrow 166. Brush structure (not shown) of the type shown in FIG. 1 is utilized with drum 114 to connect the heads externally of the drum.

In operation, the drum and tape are set into movement, the tape extending between guides 154 and 156 to position stretch 158 adjacent to the drum. Once in rotation, the drum causes the formation of an air bearing to prevent the tape from being contacted by the drum but yet allows the heads to scan the tape. During the recording phase of the operation, head 124 scans the tape and applies the record tracks thereto. After the tape has been recorded, it is reversed and then motor 146 is operated to cause shaft 116 to be elevated through a distance equal to distance 127. Thus, head 126 will be in position to scan the record tracks while head 124 will be out of scanning relationship to such tracks. The tape will then be put into motion and the drum will rotate so that heads 126, 128 and 130 scan the record tracks and sense the signals thereon. Such signals are then sent to playback apparatus such as a video receiver. The axial spacing of the playback heads provides for tape conservation so that the same signal is reproduced a number of times for each revolution of the drum.

The second embodiment of the apparatus also contemplates moving the tape axially relative to the drum. This can be done by adjusting guides 154 and 156 axially of the drum. Also, control means (not shown) is provided to assure proper alignment of the playback heads with the record tracks.

The third embodiment of this invention is broadly denoted by the numeral 210 and includes a housing 211 having a sidewall 213 provided with a pair of slots 215 and 217. Housing 211 also includes an upper compartment 212 and a lower compartment 212*a*, the slots 215 and 217 communicating with compartments 212 and 212*a* respectively. Drum means including drums 214 and 214*a* are mounted on a shaft 216 extending upwardly through the compartments and connected to a drum drive 220. The drums are disposed in respective compartments and are rotated simultaneously by shaft 216. Drum section 214 has a record head 224 on its outer periphery and drum section 214*a* has playback heads 226, 228 and 230 on its outer periphery.

Magnetic tape 248 is carried in a cartridge 249 having a pair of reels 250 and 252 therewithin. Guide means 254 in the cartridge permits the tape to be positioned partially about the outer periphery of an adjacent drum section when the tape cartridge 249 is in the corresponding slot of housing 211. A pair of reel drives 256 are provided for each of the slots 215 and 217 respectively, the two reel drives being below the support surface 258 on which cartridge 249 rests when it is inserted in the adjacent slot. The cartridge is constructed to permit coupling of the reel drives with respective reels so that the latter can be rotated to advance the tape as well as to maintain tension thereon.

In operation, cartridge 249 is disposed in slot 215 with a central stretch 260 of the tape adjacent to and along the portion of the drum section within the compartment 212. Head 224 will then scan the tape when motor 220 is operated and will apply record tracks thereto as the tape advances between reels and as the drum section rotates. The positions of guide means 254 will assure the formation of an air bearing to thereby maintain the tape out of substantial engagement with the drum section but allow the head to scan the tape.

After the tape has been recorded, it is reversed and then removed from slot 215 and inserted into slot 217 with the central stretch of the tape adjacent to and extending along drum section 214*a*. The tape is then caused to move forwardly so that the playback heads scan the record tracks on the tape. In this way, the record tracks are played back three times and the record head is out of scanning relationship to the tracks.

While separate reel drives have been shown, provision can be made to have the reels driven in any other desired manner.

I claim:

1. In a tape transport system of the skip field type for recording and playing back video signals, the combination of:
- a rotary transducer mount;
- a recording transducer peripherally disposed on said mount;
- a plurality of angularly spaced reproducing transducers peripherally disposed on said mount, said reproducing transducers being axially staggered;
- a magnetic medium;
- means for linearly driving said medium;
- rotatable means for driving said mount;
- said recording transducer being positioned on the mount in such relation to one of said reproducing transducers that, by displacements of the mount relative to the rotatable means, either the recording transducer or the multiple reproducing transducers can selectively be related to the medium for helical scanning; and
- means for imparting displacements to the mount.

2. In a tape transport system, the combination in accordance with claim 1, in which the last mentioned means is constructed and arranged to impart axial displacements to the mount.

3. In a tape transport system, the combination in accordance with claim 1, in which the last mentioned means is constructed and arranged to impart angular displacements to the mount.